US011115212B1

(12) United States Patent
Ladha et al.

(10) Patent No.: US 11,115,212 B1
(45) Date of Patent: Sep. 7, 2021

(54) MULTI-PROCESSING NODE CONNECTION IN A DATA STORE SYSTEM VIA ENCRYPTED PASSWORD

(71) Applicant: Teradata US, Inc., Dayton, OH (US)

(72) Inventors: Alnasir Ladha, Markham (CA); Blazimir Radovic, Etobicoke (CA); Zhenrong Li, Mississauga (CA); Ehtesham Siddiqui, Mississauga (CA)

(73) Assignee: Teradata US, Inc., San Diego, CA (US)

( * ) Notice: Subject to any disclaimer, the term of this patent is extended or adjusted under 35 U.S.C. 154(b) by 48 days.

(21) Appl. No.: 15/808,461

(22) Filed: Nov. 9, 2017

Related U.S. Application Data

(60) Provisional application No. 62/422,395, filed on Nov. 15, 2016.

(51) Int. Cl.
*H04L 9/32* (2006.01)
*H04L 29/06* (2006.01)
*G06F 21/62* (2013.01)
*G06F 21/31* (2013.01)

(52) U.S. Cl.
CPC ........ *H04L 9/3226* (2013.01); *H04L 63/0428* (2013.01); *H04L 63/083* (2013.01); *H04L 63/0815* (2013.01); *G06F 21/31* (2013.01); *G06F 21/629* (2013.01)

(58) Field of Classification Search
CPC .................................................... H04L 9/3226
See application file for complete search history.

(56) References Cited

U.S. PATENT DOCUMENTS

| | | | | |
|---|---|---|---|---|
| 8,887,253 B2 * | 11/2014 | Chu | ........................ | G06F 21/45 726/12 |
| 2001/0011303 A1 * | 8/2001 | Chang | .................... | H04L 51/066 709/227 |
| 2005/0223229 A1 * | 10/2005 | Roeder | ................. | H04L 63/061 713/171 |
| 2011/0135087 A1 * | 6/2011 | Kim | ...................... | H04L 9/0863 380/1 |

* cited by examiner

*Primary Examiner* — Simon P Kanaan
(74) *Attorney, Agent, or Firm* — Randy L. Campbell, Jr.

(57) ABSTRACT

A system may include a server and a data store system. The server may include at least one storage device and at least one processor. The server may execute an application and may store an encrypted password. The data store system may include at least one persistent storage device configured to store a data store. The data store system may further include a plurality of processing nodes configured to operate on the data store. The data store system may receive the encrypted password from the application with one of the plurality of processing nodes and may decrypt the encrypted password with the one of the plurality of processing nodes. The data store system may authenticate the decrypted password with the one of the processing nodes and provide the decrypted password to other processing nodes. Each processing node that has the decrypted password may be accessible to the application to operate on the data store. A method and computer-readable medium may also be implemented.

20 Claims, 5 Drawing Sheets

MULTI-PROCESSING NODE CONNECTION IN A DATA STORE SYSTEM VIA ENCRYPTED PASSWORD

CLAIM OF PRIORITY

This application claims the benefit of priority under 35 U.S.C. § 119(e) of U.S. Provisional Patent Application Ser. No. 62/422,395 filed on Nov. 15, 2016, which is hereby incorporated by reference herein in its entirety.

BACKGROUND

Application security as it relates to database access is becoming extremely important as unauthorized personnel are consistently trying to hijack applications to access connected databases in order to retrieve data which they are not authorized to view. Passwords, being the primary coordinates for authentication, have to be encrypted and protected at all times which 20 includes during storage and transmission over a network for authentication.

Organizations are consistently increasing the volume of data they are capturing, which increases the number of applications being executed in the enterprise space, as well as increasing the number of users supported in the production environment. With all of these increases, organizations are demanding application vendors review application designs to ensure optimized use of database system resources. Applications that execute complex analytics on large volumes of data are migrating to in-database type architecture using user-defined functions and stored procedures. This architecture allows the application to execute the analytics while the data still resides inside the database instead of extracting the data and processing on the middle-tier servers saving a lot of network resources.

Parallel execution of applications is fairly common practice to improve performance. If there is resource capacity available on a production system, it is more beneficial to run the application in parallel and complete the processing quicker rather than wasting this available capacity. Executing applications in parallel means each instance of the application has to secure its own connection with the database to communicate with the database. While databases allow multiple connections from external sources, most databases only allow a single or default connection once the process is inside the database.

In the case where complex analytics is being executed on large volume of data in parallel, the processes not only require multiple connections, these connections also must be encrypted to avoid the environment from becoming vulnerable. Thus, the capability to leverage encrypted database passwords used by in-database processes to secure multiple database connections is desirable.

SUMMARY

According to one aspect of the disclosure, a system may include a server. The server may include at least one storage device and at least one processor. The server may execute an application. The storage device may store an encrypted password. The system may also include a data store system. The data store system may include at least one persistent storage device configured to store a data store. The data store system may further include a plurality of processing nodes configured to operate on the data store. The data store system may receive the encrypted password from the application with one of the plurality of processing nodes. The data store system may decrypt the encrypted password with the one of the plurality of processing nodes. The data store system may authenticate the decrypted password with the one of the processing nodes. The data store system may provide the decrypted password to other processing nodes. Each processing node that has the decrypted password may be accessible to the application to operate on the data store.

According to another aspect of the disclosure, a method may include executing an application with a server. The server may include at least one storage device and at least one processor. The method may further include storing, on the storage device, an encrypted password. The method may further include receiving, with a data store system that includes a plurality of processing nodes and at least one persistent storage device configured to store a data store, the encrypted password. The method may further include decrypting the encrypted password with the one of the plurality of processing nodes. The method may further include authenticating the decrypted password with the one of the processing nodes. The method may further include providing the decrypted password to other processing nodes. Each processing node that has the decrypted password may be accessible to the application to operate on the data store.

According to another aspect of the disclosure, a non-transitory computer-readable medium encoded with a plurality of instructions may be executable by a processor. The plurality of instructions may include instructions to receive, with a data store system, an encrypted password from an application executed on an external server. The application may seek access to a data store of the data store system. The plurality of instructions may further include instructions to decrypt the encrypted password with a processing node from a plurality of processing nodes of the data store system. The method may further include instructions to authenticate the decrypted password with the processing node. The plurality of instructions may further include instructions to provide the decrypted password to other processing nodes. Each processing node that has the decrypted password may be accessible to the application to operate on the data store.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
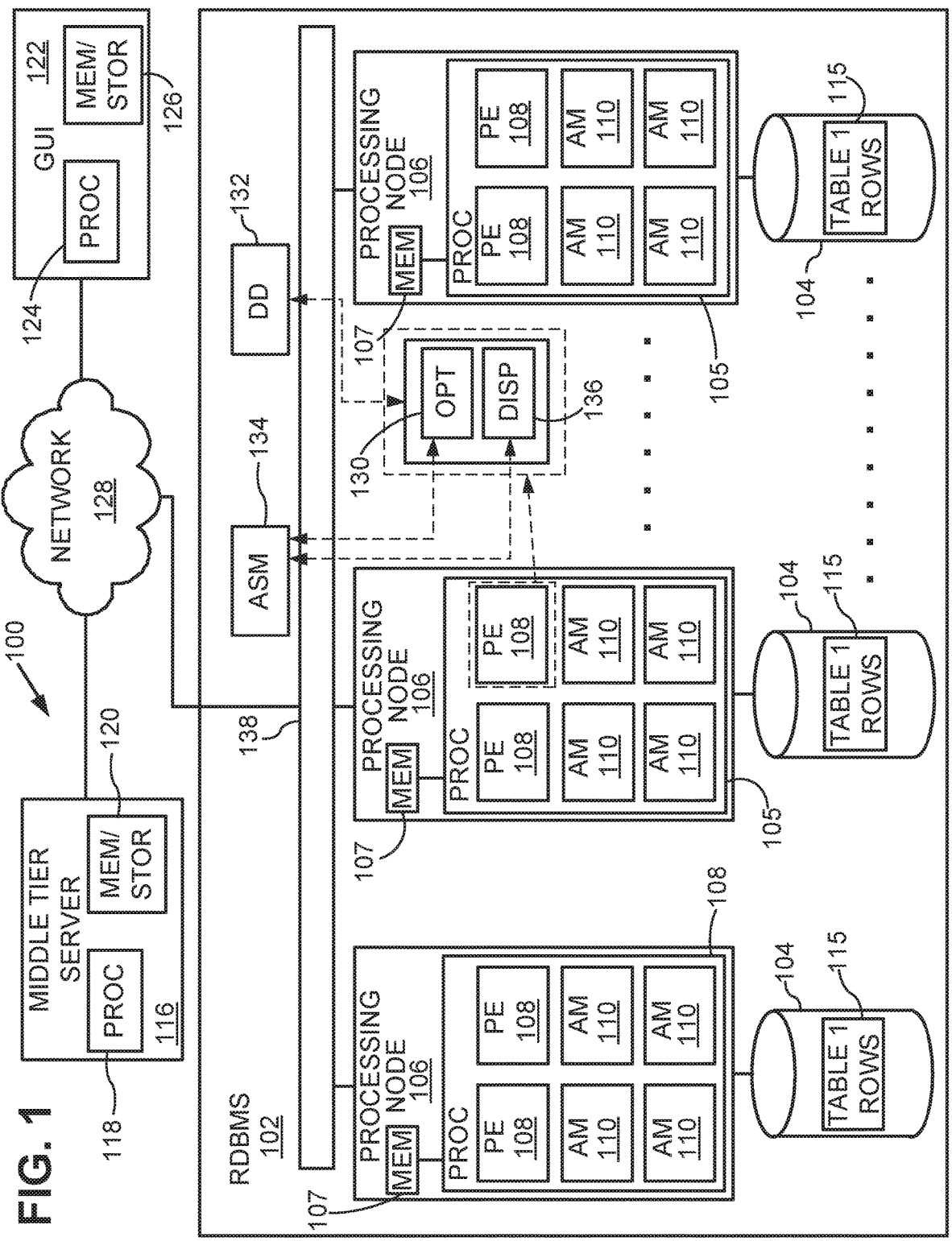
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 104. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 104. In one example, rows 115 of a table, "Table 1," are distributed across the DSFs 104 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 104 and associated access modules 110 by a hash bucket map. The characteristics of the columns chosen for the primary index determine how evenly the rows are distributed.

Rows of each stored table may be stored across multiple DSFs 104. Each parsing engine module 108 may organize the storage of data and the distribution of table rows. The parsing engine modules 108 may also coordinate the retrieval of data from the DSFs 104 in response to queries received, from various client-based system configurations. In one example, the RDBMS 102 may be accessed by a middle-tier server 116, which may contain one or more processors 118 and memory/storage 120. The middle-tier server 116 may be accessed by one or more graphical user interfaces (GUIs) 122. Each GUI 122 may include one or more processors 124 and memory/storage 126. Each GUI 122 may represent a PC, workstation, or any other device capable of accessing the middle-tier server 116. In one example, a network 128 may allow communication between the GUI 122 and the middle-tier server 116 and between the middle-tier server 116 and the RDBMS 102. The network 128 may be wired, wireless, or some combination thereof. The network 128 may be a virtual private network, web-based, directly-connected, or some other suitable network configuration.

Each parsing engine module 108, upon receiving an incoming database query, may apply an optimizer module 130 to assess the best plan for execution of the query. An example of an optimizer module 130 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 130 may access a data dictionary module 132, shown in FIG. 1 specifically for parsing engine module 108 for purposes of illustration.

The data dictionary module 132 may specify the organization, contents, and conventions of one or more databases, such as the names and descriptions of various tables maintained by the RDBMS 102 as well as fields of each database, for example. Further, the data dictionary module 132 may specify the type, length, and/or other various characteristics of the stored tables. The data dictionary module 132 may also maintain statistics on columns of the database tables being stored in the DSFs 112. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 104 or some other storage device and selectively accessed.

The RDBMS 102 may include an active system management (ASM) module 134. The ASM module 124 may be implemented as a "closed-loop" system management (CLSM) architecture capable of satisfying a set of workloadspecific goals. In other words, the RDBMS 102 is a goal-oriented workload management system capable of supporting complex workloads and capable of self-adjusting to various types of workloads. The ASM module 134 may communicate with each optimizer module 130, as shown in FIG. 1, and is adapted to convey a confidence threshold parameter and associated parameters to the optimizer module 130 in communication. Further, the ASM module 134 may communicate with a dispatcher module 136 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. The ASM module 134 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 134 is adapted to facilitate control of the optimizer module 120 pursuit of robustness with regard to workloads or queries.

An interconnection 138 allows communication to occur within and between each processing node 106. For example, implementation of the interconnection 138 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 138, the access modules 110 may also communicate with one another within the same associated processing node 106 or other processing nodes 106.

The interconnection 138 may be hardware, software, or some combination thereof. In instances of at least a partial-hardware implementation the interconnection 138, the hardware may exist separately from any hardware (e.g., processors, memory, physical wires, etc.) included in the processing nodes 106 or may use hardware common to the processing nodes 106. In instances of at least a partial-software implementation of the interconnection 138, the software may be stored and executed on one or more of the memories 107 and processors 105 of the processor nodes 106 or may be stored and executed on separate memories and processors that are in communication with the processor nodes 106. In one example, interconnection 138 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
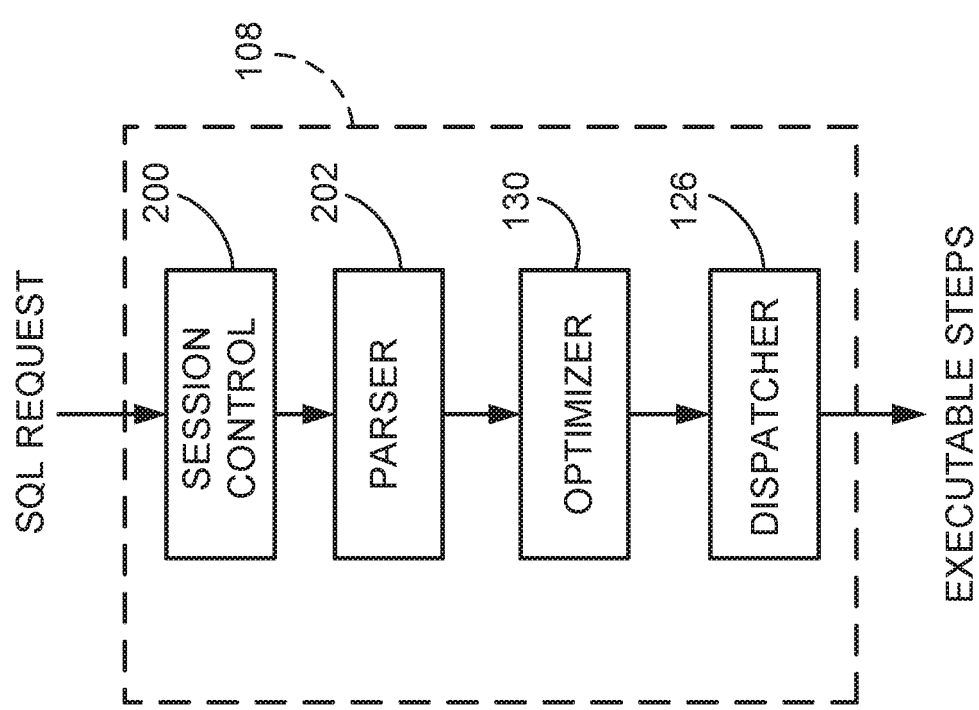
FIG. 2 is a block diagram of a portion of the example database system of FIG. 1.

In one example system, each parsing engine module 108 includes three primary components: a session control module 200, a parser module 202, and a dispatcher module 136 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
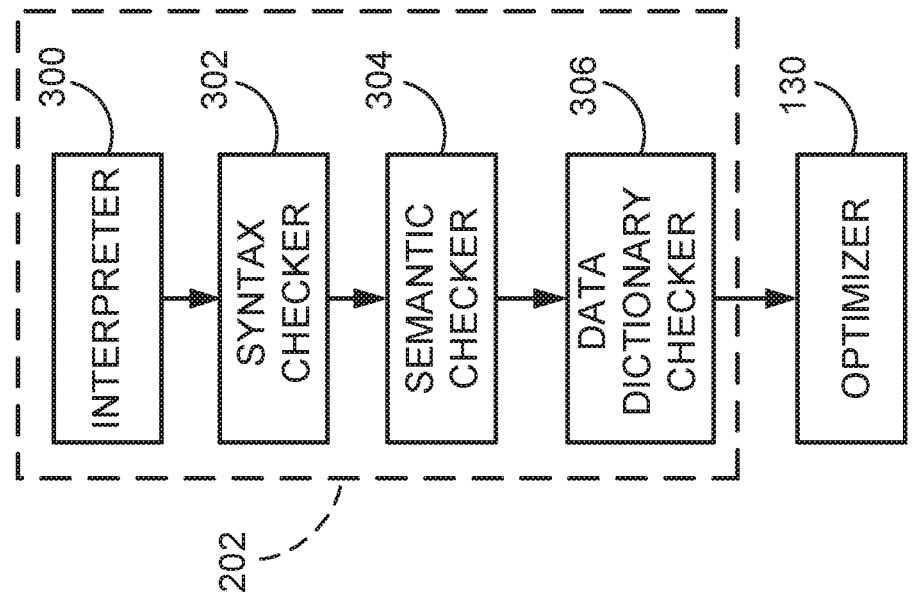
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 130 to select the least expensive plan to perform the request, and the dispatcher 136 coordinates the runtime execution of executable steps of the query execution plan of the optimizer module 130 with the access modules 110.

In one example, to facilitate implementations of automated adaptive query execution strategies, such as the examples described herein, the ASM 134 is configured to monitor runtime exception criteria. The ASM 134 monitoring takes place by communicating with the dispatcher module 136 as it checks the query execution step responses from the access modules 110. The step responses include the actual cost information, which the dispatcher module 136 may then communicate to the ASM 134 which, in turn, compares the actual cost information with the estimated costs of the optimizer module 130.

Figure 4:
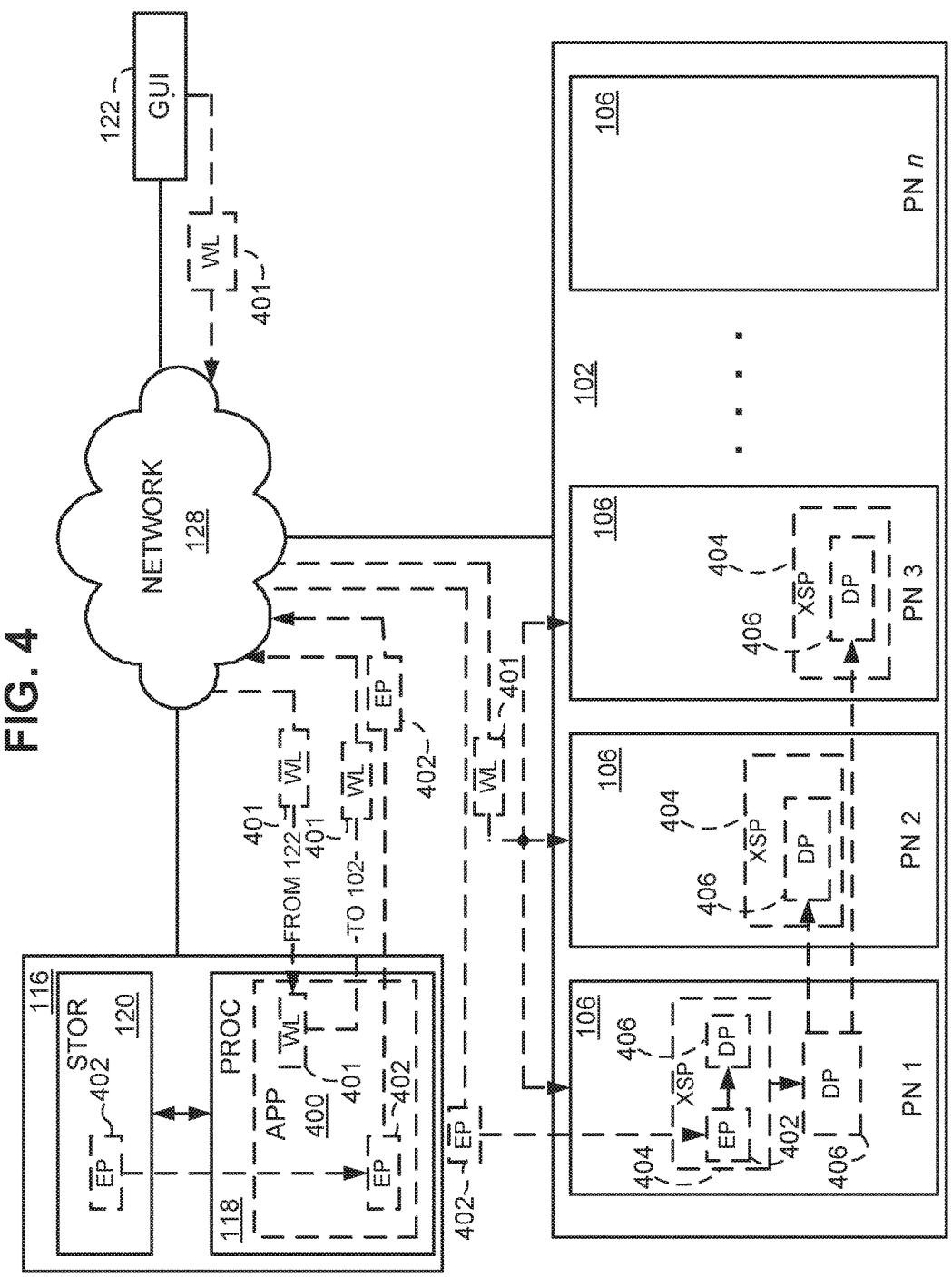
FIG. 4 is block diagram of example operation of an application accessing a database system.

In one example, an application 400 may be executed on the middle-tier server 116 on the one or more processors 118 as shown in FIG. 4. In one example, the GUI 122, through user-based input, may access the application 400 via the network 128 through a web portal or any other suitable manner to communicate with the middle-tier server 116. For example, workload 401 may be provided to the middle-tier server 116 from the GUI 122, with the workload 401 representing any number of database tasks able to be performed by the RDBMS 102 via the application 400. In one example, the middle-tier server 116 may contain an encrypted password (EP) 402 stored in the storage/memory 120 of the middle-tier server 116. The encrypted password 402 may be used by the application 400 to access the RDBMS 102. In one example, upon request to access the RDBMS 102 via the GUI 122, the application 400 may provide the encrypted password 402 to the RDBMS 102. Upon receipt of the encrypted password 402, one of the processing nodes 106 may receive the encrypted password 402. In the example of FIG. 4, the processing nodes 106 are individually designated as PN 1 through PN n where n is the number of processing nodes 106 with processing node PN 1 receiving the encrypted password 402. In one example, the encrypted password 402 may be passed to an external stored procedure ("XSP") 404 that is running on a processing node 106, such as the processing node PN 1. Execution of the XSP 404 may be initiated by receipt of the encrypted password 402. The XSP 404 may perform a decryption process to generate a decrypted password (DP) 406.

Decryption of the encrypted password 402 within the RDBMS 102 protects malicious activity by decrypting the password once inside the RDBMS 102. Additionally, the XSP 404 may authenticate the decrypted password 406. The processing node 106 decrypting the encrypted password 402 (PN 1 in FIG. 4) may provide the decrypted password 406 to other processing nodes 106 allowing multiple connections to the application 400 for the workload tasks to be processed.

Once the decrypted password 406 is generated, the decrypting processing node PN 1 may provide the decrypted password 406 to other processing nodes 106 designated to also process the workload 401. In one example, the decrypted password 406 may be provided to the other processing nodes 106 via the interconnection 138. Additionally, a parsing engine module 108 of the decrypting processing node 106 may be responsible for providing the decrypted password 406 to other processing nodes 106. The number of processing nodes 106 selected to process the workload 401 may be based on a predetermined system parameter of the RDBMS 102 or in other suitable manners. For example, processing nodes PN 2 and PN 3 also receive the decrypted password 406. Each processing node 106 may run the XSP 404 to authenticate the decrypted password 406 when received. Once each processing node 106 selected to process the workload 401 has authenticated the decrypted password 410, the application 400 may provide any such selected processing nodes 106 portions of the workload 401 to allowing multiple connections with the RDBMS 102 to be utilized by the application 400.

Figure 5:
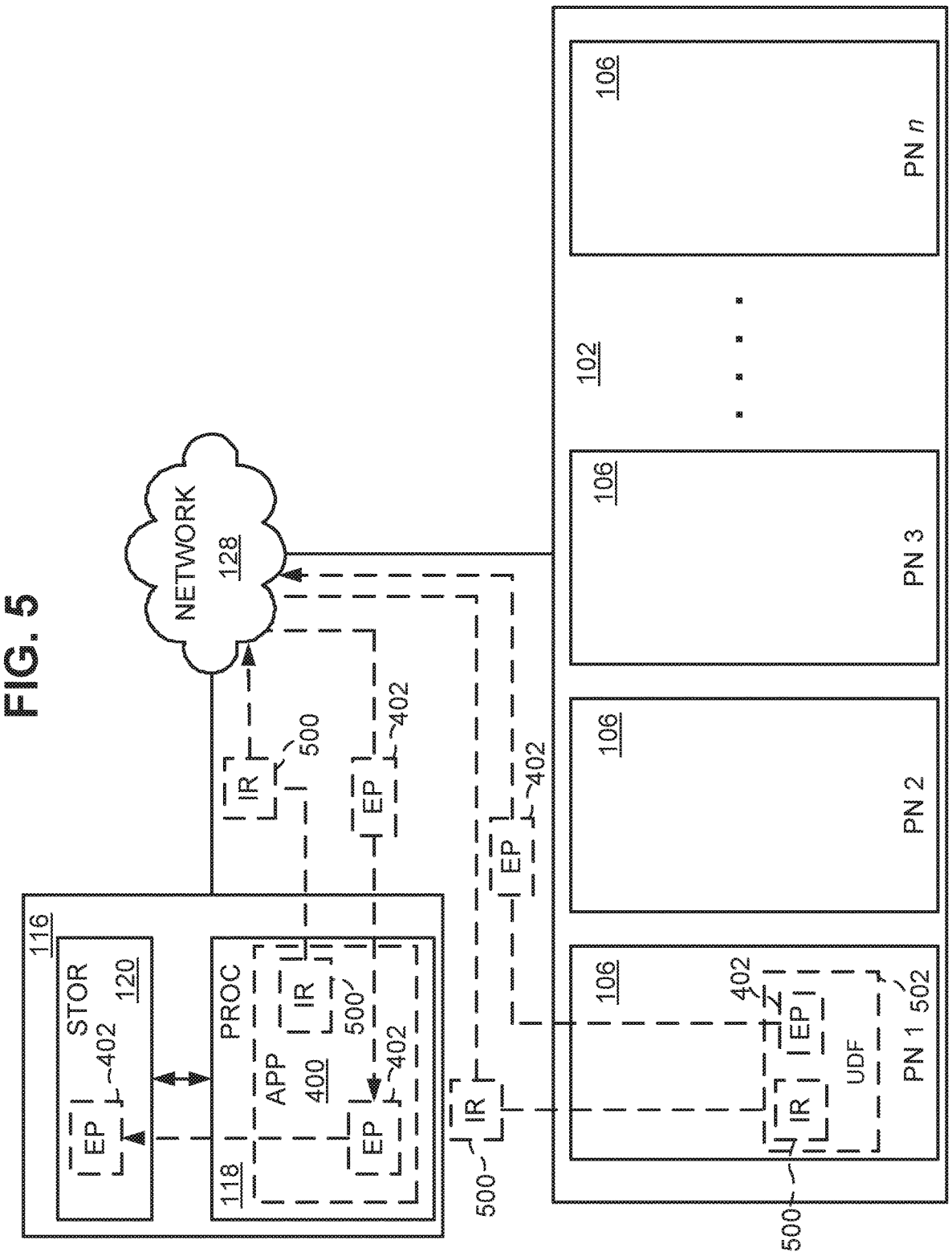
FIG. 5 is a block diagram of example installation of an application to access a database system.

In one example, the encrypted password 402 may be initially received by the application 400 during installation of the application 400 in an attempt to connect to the RDBMS 102. The application 400 may initiate an installation request (IR) 500 transmitted to one of the processing nodes 106 of the RDBMS 102, which is PN 1 in the example of FIG. 5. Receipt of the installation request 500 may invoke a user-defined function (UDF) 502 to process the installation request 500. The installation request 500 may cause the application 400 to connect to the RDBMS 102 and access the RDBMS 102 when providing a valid password. If the processing node PN 1 determines that the application 400 may access the RDBMS 102 with a valid password, the processing node PN 1 may provide the encrypted password 402 to the middle-tier server 116. The encrypted password 402 may be stored on the middle-tier server 116, or elsewhere. Once the encrypted password 402 is obtained by the middle-tier server 116, the application 400 may access the RDBMS 102 using the encrypted password 402, such as in the manner described by the example of FIG. 4.

Figure 6:
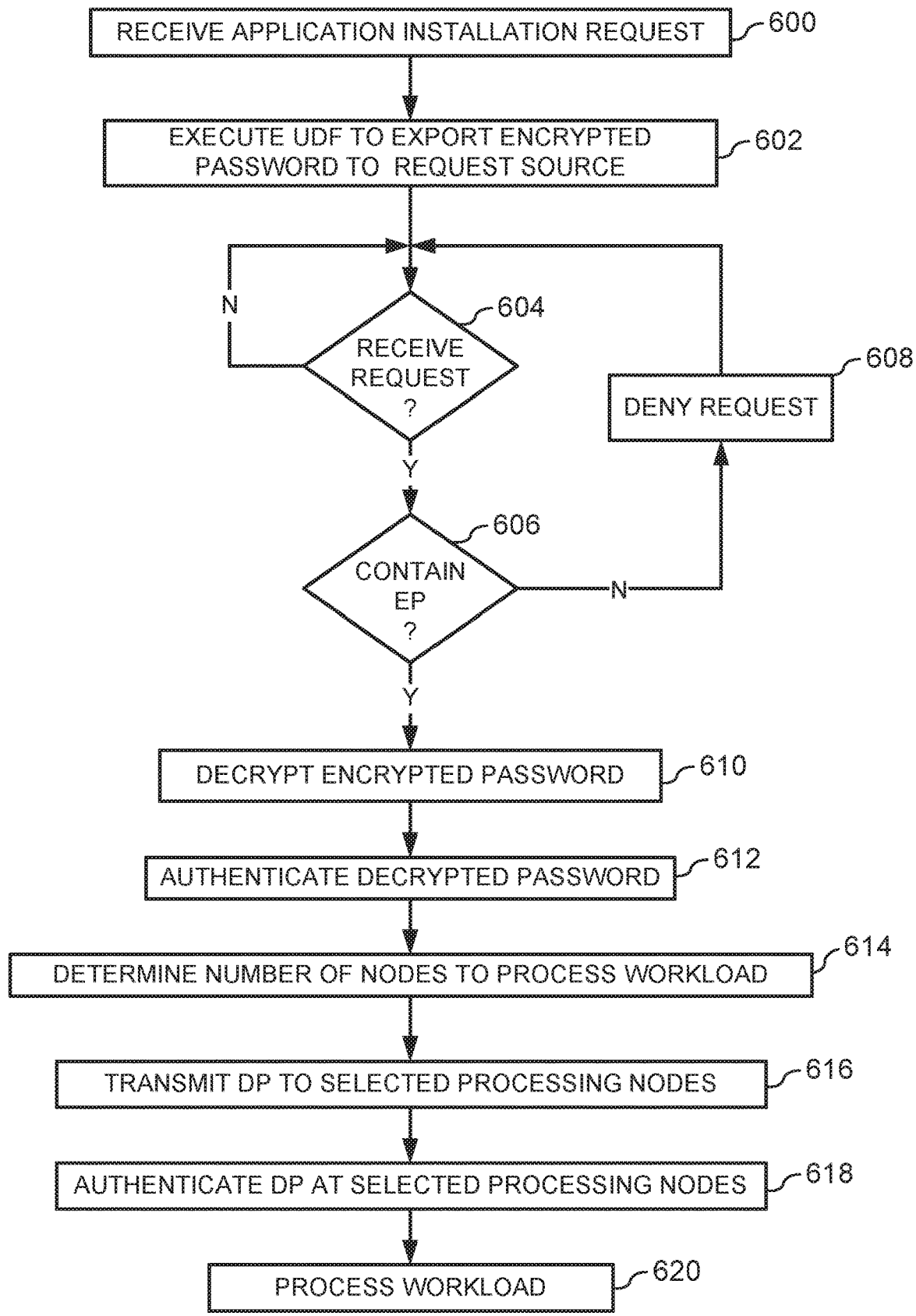
FIG. 6 is an operation flow diagram of example operation of a database system.

FIG. 6 is an operational flow diagram of example operation of the RDBMS 102. In one example, the RDBMS 102 may receive the installation request 500 from the application 400 (600). Based on receipt of the installation request 500, the RDBMS 102 may execute the UDF 502 to export the encrypted password 402 to the application 400 (602). When the RDBMS 102 receives a request from the application 400 to access the RDBMS 102 (604), the RDBMS 102 may determine if the application 400 has provided the encrypted password 402 (606). If not, the RDBMS 102 may deny the access request (608) and await another request (604). If the encrypted password 402 is provided, the RDBMS 102 may decrypt the encrypted password 402 (610) and authenticate the decrypted password 406 (612). While not shown in FIG. 6, if authentication of the decrypted password 406 fails, the RDBMS 102 may deny access to the application 400.

Once the decrypted password is authenticated, the RDBMS 102 may determine the number of total processing nodes 106 to process the workload 401 (614). In one example, this determination may be predefined or may be dynamically determined based on current system parameters and/or conditions of the RDBMS 102. Once the number of processing nodes 106 is determined, the decrypted password 406 may be provided to the processing nodes 106 selected for processing the workloads (616). Each processing node 106 receiving the decrypted password 406 may authenticate the decrypted password 406 (618). The workload 401 may then be processed at each of the selected processing nodes 106 providing multiple connections to the application 400 (620).

Although the examples here have been provided in a relational database environment, the examples shown may also be applied to any suitable data store, such as file system. Thus, the examples provided herein are not limited to relation database application and may be applied in any data store that allows data tables to be used. While various examples of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
 a server comprising at least one storage device and at least one processor, wherein the server is configured to execute an application and the storage device is configured to store an encrypted password;
 a data store system independent from the server, wherein the data store system comprises:
 at least one persistent storage device configured to store a data store;
 a plurality of processing nodes configured to operate on the data store, wherein the data store is configured to:
 receive the encrypted password from the application with one of the plurality of processing nodes;
 decrypt the encrypted password with the one of the plurality of processing nodes;
 authenticate the decrypted password with the one of the processing nodes; and
 provide, with the one of the processing nodes, the decrypted password to other processing nodes, wherein each processing node that has the decrypted password is accessible to the application to operate on the data store.

2. The system of claim 1, wherein the data store system is further configured to:
 receive an installation request from the application;
 determine if a valid password has been received from the application; and
 in response to receipt of the valid password, provide the encrypted password to the server.

3. The system of claim 2, wherein at least one of the processing nodes of the plurality of processing nodes is configured to, in response to receipt of the installation request, execute a user-defined function to process the installation request.

4. The system of claim 1, wherein the one of the plurality of processing nodes is configured to provide the decrypted password to the other processing nodes.

5. The system of claim 1, wherein the one of the plurality of processing nodes is configured to execute an external stored procedure to decrypt the encrypted password.

6. The system of claim 5, wherein the other processing nodes are configured to execute the external stored procedure to authenticate a received decrypted password.

7. The system of claim 1, wherein the server is configured to store the encrypted password in the storage device.

8. A method comprising
 executing an application with a server comprising at least one storage device and at least one processor;
 storing, on the storage device, an encrypted password;

receiving, with a data store system, the encrypted password, wherein the data store system is independent from the server, wherein the data store system comprises a plurality of processing nodes and at least one persistent storage device configured to store a data store;

decrypting the encrypted password with the one of the plurality of processing nodes;

authenticating the decrypted password with the one of the processing nodes; and providing, with the one of the processing nodes, the decrypted password to other processing nodes, wherein each processing node that has the decrypted password is accessible to the application to operate on the data store.

9. The method of claim 8, further comprising:

receiving, with the data store system, an installation request from the server;

determining, with the data store system, if a valid password has been received from the server; and in response to receipt of the valid password, provide the encrypted password to the server.

10. The method of claim 9, further comprising, in response to receipt of the installation request, executing, with at least one of the processing nodes of the plurality of processing nodes, a user-defined function to process the installation request.

11. The method of claim 8, further comprising providing, with the one of the plurality of processing nodes, the decrypted password to the other processing nodes.

12. The method of claim 8, further comprising executing, with the one of the plurality of processing nodes, an external stored procedure to decrypt the encrypted password.

13. The method of claim 12, further comprising executing, with the other processing nodes, the external stored procedure to authenticate a received decrypted password.

14. The method of claim 8, further comprising storing the encrypted password in the storage device of the server.

15. A non-transitory computer-readable medium encoded with a plurality of instructions executable by a processor, the plurality of instructions comprising:

instructions to receive, with a data store system, an encrypted password from an application executed on an external server, wherein the application seeks access to a data store of the data store system, wherein the data store system is independent from the external server;

instructions to decrypt the encrypted password with a processing node from a plurality of processing nodes of the data store system;

instructions to authenticate the decrypted password with the processing node; and instructions to provide, with the processing node, the decrypted password to other processing nodes, wherein each processing node that has the decrypted password is accessible to the application to operate on the data store.

16. The non-transitory computer-readable medium of claim 15, wherein the plurality of instructions further comprises:

instructions to receive, with the data store system, an installation request from the application;

instructions to determine, with the data store system, if a valid password has been received from the server; and in response to receipt of the valid password, instructions to provide, with the data store system, the encrypted password to the server.

17. The non-transitory computer-readable medium of claim 15, wherein the plurality of instructions further comprises, in response to receipt of the installation request, instructions to execute, with at least one of the processing nodes of the plurality of processing nodes, a user-defined function to process the installation request.

18. The non-transitory computer-readable medium of claim 15, wherein the plurality the plurality of instructions further comprises instructions to provide, with the one of the plurality of processing nodes, the decrypted password to the other processing nodes.

19. The non-transitory computer-readable medium of claim 15, wherein the plurality of instructions further comprises instructions to execute, with the one of the plurality of processing nodes, an external stored procedure to decrypt the encrypted password.

20. The non-transitory computer-readable medium of claim 15, wherein the plurality of instructions further comprises instructions to execute, with the other processing nodes, the external stored procedure to authenticate a received decrypted password.

* * * * *